(12) United States Patent
Okon et al.

(10) Patent No.: US 9,671,247 B2
(45) Date of Patent: Jun. 6, 2017

(54) METHOD FOR CALIBRATING VIBRATORY GYROSCOPE

(71) Applicant: Innalabs Limited, Dublin (IE)

(72) Inventors: Isaak Markovich Okon, Brooklyn, NY (US); Alain Renault, Le Cannet (FR); Jose Beitia, Dublin (IE)

(73) Assignee: Innalabs Limited, Dublin (IE)

( * ) Notice: Subject to any disclaimer, the term of this patent is extended or adjusted under 35 U.S.C. 154(b) by 660 days.

(21) Appl. No.: 14/332,602

(22) Filed: Jul. 16, 2014

(65) Prior Publication Data

US 2016/0018243 A1    Jan. 21, 2016

(51) Int. Cl.
  *G01C 19/00*    (2013.01)
  *G01C 19/567*   (2012.01)
  (Continued)

(52) U.S. Cl.
  CPC ............. *G01C 25/00* (2013.01); *G01C 19/56* (2013.01); *G01C 19/5776* (2013.01);
  (Continued)

(58) Field of Classification Search
  CPC ...... G01C 25/00; G01C 25/005; G01C 19/00; G01C 19/56; G01C 19/5614;
  (Continued)

(56) References Cited

U.S. PATENT DOCUMENTS 6,498,996 B1 * 12/2002 Vallot ................ G01C 19/56
  702/103
8,011,245 B2 * 9/2011 Yatzenko ........... G01C 19/5691
  73/504.13
(Continued)

FOREIGN PATENT DOCUMENTS

EP    2 166 308 A1    3/2010
EP    2 696 169 A2    2/2014
WO    WO 2004/046650 A1    6/2004

OTHER PUBLICATIONS

Search report in PCT/EP2015/066189 dated Nov. 5, 2015.

*Primary Examiner* — Nguyen Ha
(74) *Attorney, Agent, or Firm* — Bardmesser Law Group (57) ABSTRACT

The present invention is concerned with a method of calibrating a vibrating gyroscope. The method comprises exciting a vibration along an excitation axis of a resonant structure wherein the excitation axis is positioned at a first angular position, sensing the vibration of the resonant structure on a first sensing axis of the resonant structure while the excitation axis is positioned at the first angular position, generating a first sensing signal indicative of the sensed vibration of the resonant structure on the first sensing axis, rotating the excitation axis in a continuous manner around the resonant structure to a second angular position, sensing the vibration of the resonant structure on a second sensing axis of the resonant structure while the excitation axis is positioned at the second angular position, generating a second sensing signal indicative of the sensed vibration of the resonant structure on the second sensing axis and adding the first sensing signal to the second sensing signal in order to derive a bias of the gyroscope.

33 Claims, 3 Drawing Sheets

(51) Int. Cl.
*G01C 25/00* (2006.01)
*G01C 19/56* (2012.01)
*G01C 19/5776* (2012.01)
*G01C 19/5614* (2012.01)
*G01C 19/5649* (2012.01)
*G01C 19/5726* (2012.01)

(52) U.S. Cl.
CPC ......... *G01C 25/005* (2013.01); *G01C 19/567* (2013.01); *G01C 19/5614* (2013.01); *G01C 19/5649* (2013.01); *G01C 19/5726* (2013.01)

(58) Field of Classification Search
CPC .............. G01C 19/5649; G01C 19/567; G01C 19/5726; G01C 19/5776
See application file for complete search history.

(56) References Cited

U.S. PATENT DOCUMENTS

| | | | | |
|---|---|---|---|---|
| 9,157,739 B1* | 10/2015 | Beitia | ..................... | G01C 25/00 |
| 2003/0033850 A1* | 2/2003 | Challoner | .............. | G01C 19/56 |
| | | | | 73/1.77 |
| 2005/0256659 A1* | 11/2005 | Malvern | .............. | G01C 19/567 |
| | | | | 702/96 |
| 2010/0071465 A1* | 3/2010 | Stewart | .............. | G01C 19/5719 |
| | | | | 73/504.02 |
| 2010/0095771 A1 | 4/2010 | Lignon | | |

* cited by examiner

METHOD FOR CALIBRATING VIBRATORY GYROSCOPE

The present invention relates to a vibrating gyroscope. In particular, the present invention relates to a method of calibrating a vibrating gyroscope.

A gyroscope is a device that may be used to measure a rate of angular rotation.

Measurements of a rate of angular rotation may be integrated over time in order to determine a change in the angular orientation of the gyroscope. If an initial orientation of the gyroscope is known, then a determination of a change in the angular orientation of the gyroscope may be used to derive the orientation of the gyroscope at a time after the change in the angular orientation. A gyroscope may, for example, be used in applications such as inertial navigation systems (INS), ground vehicle stabilization, aircraft, ships and/or other applications.

A vibrating gyroscope is a type of gyroscope in which a resonant structure is caused to vibrate. A vibrating gyroscope may be referred to as a vibrating structure gyroscope and/or a Coriolis vibrating gyroscope (CVG). A wide variety of resonant structures may be used to form a vibrating gyroscope, including rings, cylinders, hemispheres, tuning forks and beams. Vibrating gyroscopes have many advantages over traditional gyroscopes (based on a spinning mass) and over gyroscopes based on fiber-optic and/or other optical technologies. For example, vibrating gyroscopes may be cheaper than fiber optic gyroscopes, and may be smaller and include fewer parts than spinning mass gyroscopes.

In order for a vibrating gyroscope to accurately measure a rate of angular rotation it has to be calibrated. It is an object of the present invention to obviate or mitigate a disadvantage associated with known calibration methods.

SUMMARY OF THE INVENTION

According to a first aspect, there is provided a method of calibrating a vibrating gyroscope comprising exciting a vibration along an excitation axis of a resonant structure, wherein the excitation axis is positioned at a first angular position, sensing the vibration of the resonant structure on a first sensing axis of the resonant structure, while the excitation axis is positioned at the first angular position, generating a first sensing signal indicative of the sensed vibration of the resonant structure on the first sensing axis, rotating the excitation axis in a continuous manner around the resonant structure to a second angular position, sensing the vibration of the resonant structure on a second sensing axis of the resonant structure while the excitation axis is positioned at the second angular position, generating a second sensing signal indicative of the sensed vibration of the resonant structure on the second sensing axis, and adding the first sensing signal to the second sensing signal in order to derive a bias of the gyroscope.

The method allows the gyroscope to be calibrated while simultaneously determining the rotation rate of the gyroscope. The rotation rate of the gyroscope may be continuously monitored while the gyroscope is being calibrated. This advantageously allows the gyroscope to be calibrated during use without any significant interruption in the measurement of the rotation rate of the gyroscope. This may, for example, remove a need to provide multiple gyroscopes that measure the same rotation rate.

The first angular position of the excitation axis may be separated from the second angular position of the excitation axis by approximately 45°.

The first sensing axis may be aligned at an angle of approximately 45° relative to the first angular position of the excitation axis.

The second sensing axis may be aligned at an angle of approximately 45° relative to the second angular position of the excitation axis.

The method may further comprise determining a rotation rate of the gyroscope while the excitation axis is rotated.

The rotation rate of the gyroscope may be determined from the first sensing signal and the second sensing signal.

The determined rotation rate of the gyroscope may be used to determine the bias of the gyroscope.

The method may further comprise determining a scale factor of the gyroscope.

The determined scale factor may be used to determine the bias of the gyroscope.

Determining the scale factor may comprise rotating the excitation axis in a first direction and at a first speed towards an angular position, sensing the vibration of the resonant structure on a sensing axis at a first time shortly before the excitation axis reaches the angular position and generating a first scale factor sensing signal indicative of the sensed vibration, rotating the excitation axis away from the angular position at the first speed and in a second direction opposite to the first direction, sensing the vibration of the resonant structure on the sensing axis at a second time shortly after the excitation axis leaves the angular position and generating a second scale factor sensing signal which is indicative of the sensed vibration and calculating the difference between the first and second scale factor sensing signals in order to derive a scale factor of the gyroscope.

The sensing axis may be separated from the angular position by approximately 45°.

The difference between the first time and the second time may be less than approximately 50 milliseconds.

According to a second aspect there is provided a gyroscope comprising a resonant structure, a first and second pair of actuators configured to excite a vibration along an excitation axis of the resonant structure, the first and second pair of actuators being operable to rotate the excitation axis in a continuous manner between a first angular position and a second angular position, a first pair of sensors configured to sense the vibration of the resonant structure along a first sensing axis while the excitation axis is at the first angular position, and generate a first sensing signal indicative of the sensed vibration, a second pair of sensors configured to sense the vibration of the resonant structure along a second sensing axis while the excitation axis is at the second angular position and generate a second sensing signal indicative of the sensed vibration, a controller configured to add the first sensing signal to the second sensing signal in order to derive a bias of the vibrating gyroscope.

The first angular position of the excitation axis may be separated from the second angular position of the excitation axis by approximately 45°.

The first sensing axis may be aligned at an angle of approximately 45° relative to the first angular position of the excitation axis.

The second sensing axis may be aligned at an angle of approximately 45° relative to the second angular position of the excitation axis.

The controller may be further configured to determine a rotation rate of the gyroscope while the excitation axis is being rotated.

The controller may be configured to determine the rotation rate of the gyroscope from the first and second sensing signals.

The controller may be configured to use the determined rotation rate of the gyroscope to determine the bias of the gyroscope.

The gyroscope may further comprise a first feedback loop configured to compare the amplitude of vibrations sensed by the first pair of sensors to a first reference amplitude signal and regulate the first pair of actuators according to the comparison.

The gyroscope may further comprise a second feedback loop configured to compare the amplitude of vibrations sensed by the second pair of sensors to a second reference amplitude signal and regulate the second pair of actuators according to the comparison.

Rotating the excitation axis between the first angular position and the second angular position may comprise altering the first and second reference amplitude signals.

The first and/or the second feedback loop may comprise analogue electronics.

The controller may be further configured to determine a scale factor of the gyroscope.

The controller may be configured to use the determined scale factor to determine the bias of the gyroscope.

The first and second pair of actuators may be configured to rotate the excitation axis in a first direction and at a first speed towards an angular position and to rotate the excitation axis away from the angular position at the first speed and in a second direction which is opposite to the first direction. The first pair of sensors may be configured to sense the vibration of the resonant structure on a sensing axis at a first time shortly before the excitation axis reaches the angular position and generate a first scale factor sensing signal which is indicative of the sensed vibration. The first pair of sensors may be further configured to sense the vibration of the resonant structure on the sensing axis at a second time shortly after the excitation axis leaves the angular position and generate a second scale factor sensing signal indicative of the sensed vibration. The controller may be configured to calculate the difference between the first and second scale factor sensing signals in order to derive a scale factor of the gyroscope.

The sensing axis may be separated from the angular position by approximately 45°.

The difference between the first time and the second time may be less than approximately 50 milliseconds.

According to a third aspect, there is provided a gyroscope comprising a resonant structure, a first and second pair of actuators configured to excite a vibration along an excitation axis, a first pair of sensors configured to sense the vibration of the resonant structure along a first sensing axis and generate a first sensing signal indicative of the sensed vibration, a first feedback loop comprising analogue electronics configured to compare the first sensing signal to a first reference amplitude signal and drive the first pair of actuators according to the comparison, a second pair of sensors configured to sense the vibration of the resonant structure along a second sensing axis and generate a second sensing signal indicative of the sensed vibration, a second feedback loop comprising analogue electronics configured to compare the second sensing signal to a second reference amplitude signal and drive the second pair of actuators according to the comparison and a controller configured to provide the first reference amplitude signal to the first feedback loop and to provide the second reference amplitude signal to the second feedback loop, wherein the controller is operable to vary the first and second reference amplitude signals to bring about a rotation of the excitation axis around the resonant structure.

Comparing the first sensing signal to the first reference amplitude signal may comprise demodulating the first sensing signal with respect to a first oscillating phase reference signal and determining the difference between the demodulated signal and the first reference amplitude signal.

Comparing the second sensing signal to the second reference amplitude signal may comprise demodulating the second sensing signal with respect to a second oscillating phase reference signal and determining the difference between the demodulated signal and the second reference amplitude signal.

The first oscillating phase reference signal and the second phase reference signal may have the same frequency and phase.

The controller may be operable to vary the first and second reference amplitude signals such that they are sinusoidal signals with respect to time.

The controller may be operable to vary the first and second reference amplitude signals such that the sinusoidal signals have a substantially constant phase difference of $\pi/2$.

The controller may be operable to vary the first and second reference amplitude signals such that the sinusoidal signals have substantially the same amplitude.

The controller may be further configured to add the first sensing signal to the second sensing signal in order to derive a bias of the vibrating gyroscope.

The controller may be further configured to vary the first and second reference amplitude signals in order to bring about a rotation of the excitation axis in a first direction and at a first speed towards an angular position and vary the first and second reference amplitude signals to bring about a rotation of the excitation axis away from the angular position at the first speed and in a second direction, which is opposite to the first direction. The first pair of sensors may be configured to sense the vibration of the resonant structure on a sensing axis at a first time shortly before the excitation axis reaches the angular position and generate a first scale factor sensing signal indicative of the sensed vibration. The first pair of sensors may be further configured to sense the vibration of the resonant structure on the sensing axis at a second time shortly after the excitation axis leaves the angular position and generate a second scale factor sensing signal indicative of the sensed vibration. The controller may be further configured to calculate the difference between the first and second scale factor sensing signals in order to derive a scale factor of the gyroscope.

BRIEF DESCRIPTION OF THE DRAWINGS

Embodiments of the invention will now be described, by way of example only, with reference to the accompanying schematic drawings, in which.

DETAILED DESCRIPTION OF THE INVENTION

Figure 1:
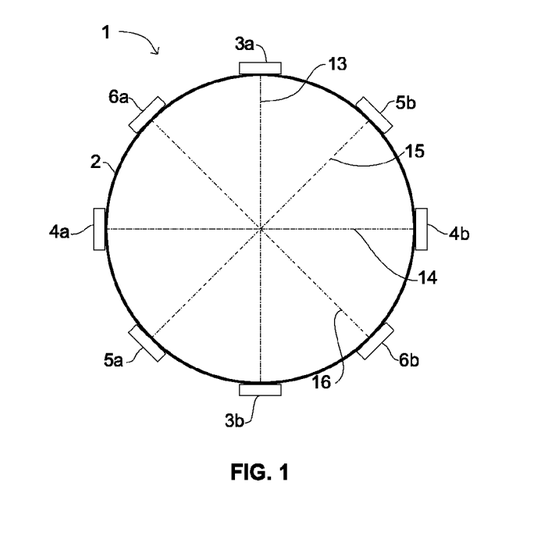
FIG. 1 is a schematic illustration of a gyroscope.

FIG. 1 is a schematic representation of a vibrating gyroscope 1. The gyroscope 1 comprises a resonant structure 2. The resonant structure 2 of FIG. 1 may, for example, comprise a cylinder. The resonant structure 2 may have a form as depicted in European Patent Application EP2669629, which is hereby incorporated by reference in its entirety. In other embodiments, a resonant structure 2 having a different shape may be used. The resonant structure 2 may be any axially symmetric structure. For example, the resonant structure 2 may comprise a planar ring, a hemisphere or a four-pronged tuning fork, which may be referred to as a quapason. The resonant structure 2 may be formed of one or more of a range of different materials. For example, the resonant structure 2 may be formed of a metal, piezoelectric ceramics, fused quartz (fused silica) and/or thin-film silicon layers.

In the arrangement shown in FIG. 1, a plurality of actuators and sensors 3-6 are positioned around the resonant structure 2. The actuators and sensors 3-6 may, for example, comprise piezoelectric or electrostatic elements. A first pair of actuators 3a, 3b are positioned at opposite ends of an antinode excitation axis 13 which extends across the resonant structure 2. A first pair of sensors 4a, 4b are positioned at opposite ends of an antinode detection axis 14 which extends across the resonant structure 2, so as to form an angle of 90° with the antinode excitation axis 13. A second pair of actuators 5a, 5b are positioned at opposite ends of a node excitation axis 15, which extends across the resonant structure 2, so as to form an angle of 45° with both the antinode excitation axis 13 and the antinode detection axis 14. A second pair of sensors 6a, 6b are positioned at opposite ends of a node detection axis 16, which extends across the resonant structure 2, so as to form an angle of 45° with the antinode excitation axis 13 and the antinode detection axis 14. The node detection axis 16 forms an angle of 90° with the node excitation axis 15.

Figure 2:
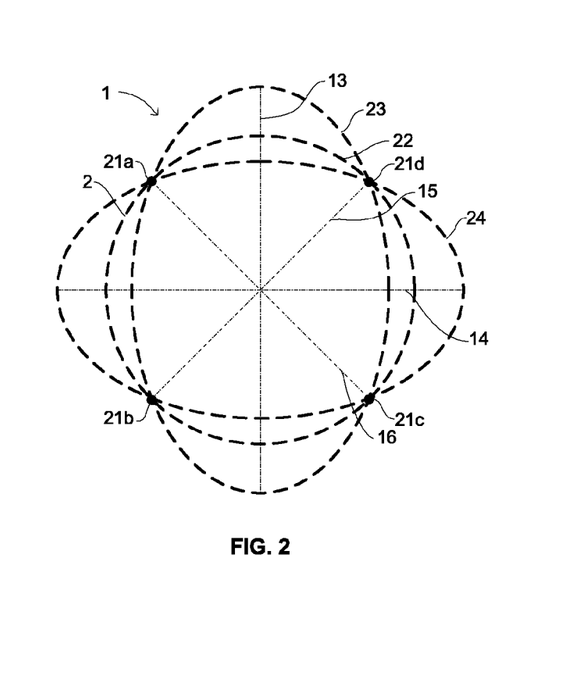
FIG. 2 is a schematic illustration of a resonant structure at different positions during a vibration.

The first pair of actuators 3a, 3b drive a vibration along the antinode excitation axis 13. The vibration may be at a resonant frequency of the resonant structure 2. FIG. 2 is a schematic depiction of the resonant structure 2 at different positions during a vibration, which is driven along the antinode excitation axis 13. For ease of illustration, the actuators and sensors 3-6 are omitted from FIG. 2. The first pair of actuators 3a, 3b apply forces to the resonant structure 2, such that the resonant structure 2 oscillates between a first position 23 (in which the resonant structure 2 is elongated into an ellipse whose semi-major axis is substantially aligned with the antinode excitation axis 13) and a second position 24 (in which the resonant structure 2 is elongated into an ellipse whose semi-major axis is substantially aligned with the antinode detection axis 14). It will be appreciated that during the oscillation, the resonant structure 2 transitions through a third position 22, which is the position to which the resonant structure 2 relaxes to when the resonant structure 2 is not forced to vibrate.

If the vibrating gyroscope 1 is stationary, then the vibrations of the resonant structure 2 are such that there are four nodes 21a-21d at which the resonant structure 2 is substantially stationary. The nodes 21a-21d are substantially positioned on the node detection axis 15 and the node excitation axis 16. The points at which the resonant structure 2 intersects the antinode excitation axis 13 and the antinode detection axis 14 may be referred to as antinodes, since these points represent points at which the amplitude of the vibration of the resonant structure 2 is at a maximum.

When the gyroscope 1 undergoes a rotation, the antinode excitation axis 13 rotates and the vibrations in the resonant structure 2 are driven (by the first pair of actuators 3a, 3b) along a different direction to the direction in which they were driven prior to the rotation. However, the vibrations in the resonant structure 2 have an inertia, which causes vibrations to persist in the same direction as the direction in which the vibrations were occurring before the gyroscope 1 rotated. The vibrations in the resonant structure 2 rotate with the rotation of the gyroscope 1, however, the inertia of the vibrations causes the rotation of the vibrations to lag behind the rotation of the gyroscope 1. A rotation of the gyroscope 1 therefore causes vibrations to occur in directions that are not aligned with the antinode excitation axis 13 or the antinode detection axis 14. If no force is applied to the nodes 21a-21d, then this effect causes a movement of the resonant structure 2 to be induced at the nodes 21a-21d.

In order to measure the rotation rate of the gyroscope 1, the second pair of actuators 5a, 5b may act to null the nodes 21a-21d, such that substantially no displacement of the resonant structure 2 occurs at the nodes 21a-21d. As will be described further below, the force that is applied in order to null the nodes 21a-21d is directly proportional to the rate of rotation of the gyroscope 1, and thus measurement of this force may be used to measure the rate of rotation of the gyroscope 1.

Figure 3:
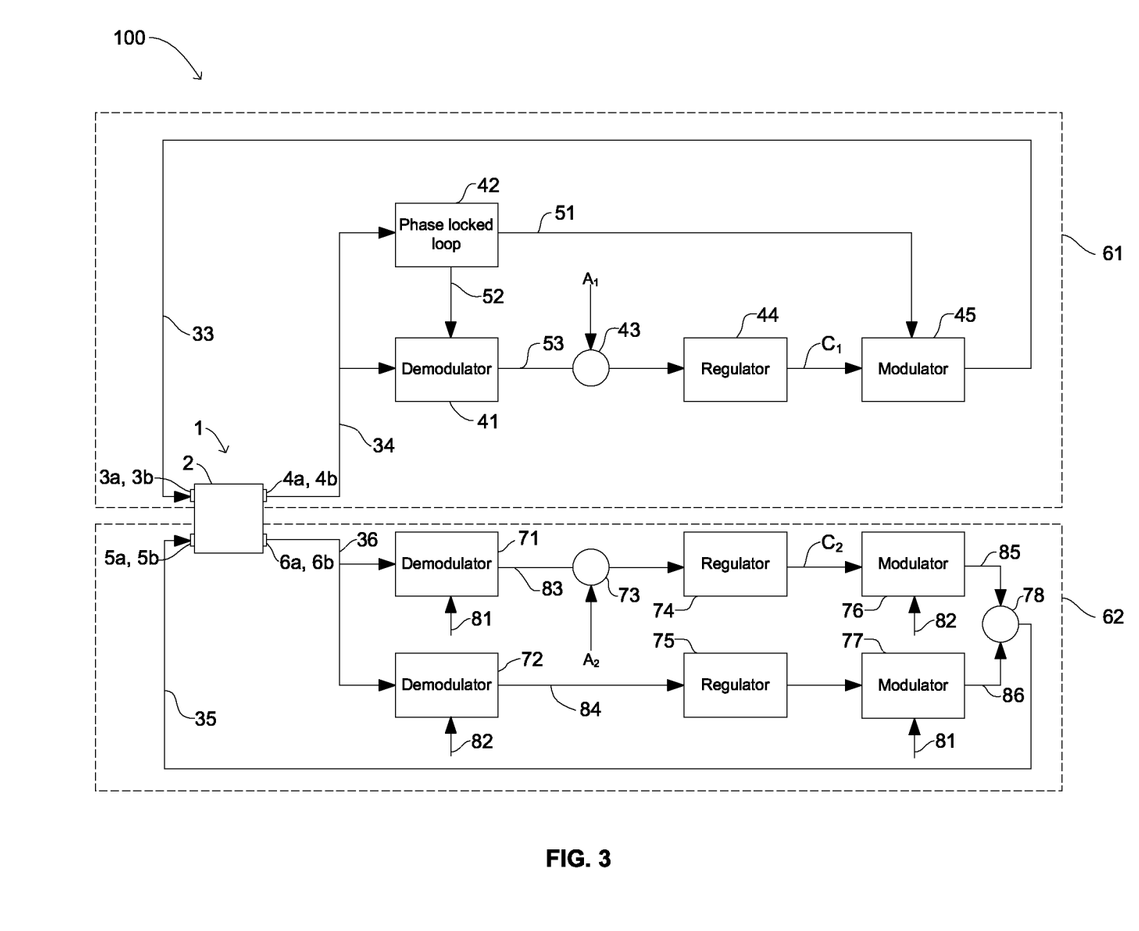
FIG. 3 is a schematic illustration of a control system.

FIG. 3 is a block diagram of a control system 100 that may be used to control the actuators 3-6 and to measure the rotation of the gyroscope 1. For ease of illustration, the layout of the actuators and sensors 3-6 around the resonant structure 2 is not shown, and instead, the resonant structure 2 is shown in block form with the actuators and sensors 3-6 acting as inputs and outputs to the resonant structure 2. In an embodiment, the control system 100 is realized using analog electronics.

The first pair of actuators 3a, 3b are controlled by an antinode feedback loop 61. An antinode detection signal 34 is output from the first pair of sensors 4a, 4b and serves as an input signal to the antinode feedback loop 61. The first pair of sensors 4a, 4b measure the vibration of the resonant structure 2 along the antinode detection axis 14 and output an antinode detection signal 34, which is indicative of the vibration. The antinode detection signal 34 is input to a demodulator 41 and a phase locked loop 42. The phase locked loop 42 outputs an excitation phase reference signal 51 and a detection phase reference signal 52 based on the frequency and phase of the antinode detection signal 34. The excitation phase reference signal 51 oscillates at a frequency at which the resonant structure 2 is driven to vibrate and is in phase with vibrations of the resonant structure 2 along the antinode excitation axis 13. The phase locked loop 42 acts to keep vibrations of the resonant structure 2 at resonance.

The detection phase reference signal 52 is an oscillating signal that has a constant phase difference of $$\frac{\pi}{2}$$

with the excitation phase reference signal 51. The detection phase reference signal 52 is therefore in phase with the vibrations of the resonant structure 2 along the antinode detection axis 14. The detection phase reference signal 52 is input to the demodulator 41 such that the demodulator 41 outputs a DC signal 53, which is indicative of the amplitude of the component of the antinode detection signal 34, which is in phase with the detection phase reference signal 52. The DC signal 53 is subtracted from a first reference amplitude signal $A_1$ at a subtractor 43. In this case the first reference amplitude signal $A_1$ is equal to a vibration amplitude signal $A_1$, which is a desired amplitude of vibration of the resonant structure 2. The difference between the first reference amplitude signal $A_1$ and the DC signal 53 is input to a regulator

44. The regulator 44 outputs a first control signal $C_1$. To a good approximation the first control signal $C_1$ is given by equation 1.

$$C_1 = G_1 A k \qquad (1)$$

Where $G_1$ is a first gain of the gyroscope 1, k is a damping coefficient of the resonant structure 2 and A is the amplitude of excited vibrations in the resonant structure 2. The first gain $G_1$ is dependent, amongst other things, on electronic gains of the actuators and sensors 3-6 and gains in the control system 100.

The first control signal $C_1$ is modulated (by a modulator 45) by the excitation phase reference signal 51, such that it has a constant phase difference of $$\frac{\pi}{2}$$

with the vibrations along the antinode excitation axis 13 and is input to the first pair of actuators 3a, 3b as an antinode excitation signal 33. The antinode excitation signal 33 drives the first pair of actuators 3a, 3b so as to overcome damping forces in the resonant structure 2. The antinode feedback loop 61 serves to drive the first pair of actuators 3a, 3b in order to maintain vibrations of the resonant structure 2 along the antinode axes 13, 14 of a desired amplitude, frequency and phase.

The control system 100 also includes a node feedback loop 62. A node detection signal 36 is output from the second pair of sensors 6a, 6b and serves as an input signal to the node feedback loop 62. The second pair of sensors 6a, 6b measure vibrations of the resonant structure 2 along the node detection axis 16 and output a node detection signal 36 which is indicative of these vibrations. The node detection signal 36 is input to a first demodulator 71 and a second demodulator 72. The demodulator 71 demodulates the node detection signal 36 with reference to a node detection phase reference signal 81. The node detection phase reference signal 81 is an oscillating signal that is in phase with the detection phase reference signal 52. In practice the same signal may be used for the node detection phase reference signal 81 and the detection phase reference signal 52. The demodulator 71 outputs a DC signal 83 which is indicative of the amplitude of vibrations at the nodes 21a-21d which are due to the vibrations which are excited by the first pair of actuators 3a, 3b. As described above, vibrations at the nodes 21a-21d may be caused by a rotation of the gyroscope 1.

The DC signal 83 is subtracted from a second reference amplitude signal $A_2$ at a subtractor 73. The second reference amplitude signal $A_2$ is indicative of a desired amplitude of vibrations of the resonant structure along the node axes 15, 16. During normal operation of the gyroscope 1, it is desirable to null the nodes 21a-21d such that substantially no vibration occurs along the node axes 15, 16. The second reference amplitude signal $A_2$ is therefore set to zero. The difference between the first reference amplitude signal $A_2$ and the DC signal 83 is input to a regulator 74. The regulator 74 outputs a second control signal $C_2$. As will be described further below, the second control signal $C_2$ is dependent on the rotation rate of the gyroscope 1. The second control signal $C_2$ is modulated (using a modulator 76) by a node excitation phase reference signal 82. The node excitation phase reference signal 82 has a constant phase difference of $$\frac{\pi}{2}$$

with respect to the node detection phase reference signal 81. The signal 85 which is output from the modulator 76 is indicative of a force which when applied by the second pair of actuators 5a, 5b counteracts vibrations along the node axes 15, 16, which are caused by the vibrations that are excited along the antinode axes 13, 14 and rotation of the gyroscope 1.

The node detection signal 36 is also input to the second demodulator 72. The demodulator 72 demodulates the node detection signal 36 with reference to the node detection phase reference signal 82. The node detection phase reference signal 82 has a constant phase difference of $\pi/2$ with vibrations that occur along the node axes 15, 16, and which are caused by the vibrations which are excited along the antinode axes 13, 14. The demodulator 72 outputs a DC signal 84 which is indicative of the amplitude of vibrations along the node detection axis 16 which are $\pi/2$ out of phase with vibrations that are excited along the antinode excitation axis 13. This DC signal 84 may be considered to be an error signal. The error signal may arise due to a mismatch between the frequencies of vibrational modes in the resonant structure 2. A frequency mismatch between vibrational modes may cause the vibrational modes to be driven away from the antinode excitation axis 13 and/or the antinode detection axis 14 and may therefore induce vibrations of the resonant structure 2 at the nodes 21a-21d. These may be referred to as quadrature vibrations.

The DC signal 84 is input to a regulator 75 and the output of the regulator 75 is modulated by the node detection phase reference signal 81. The signal 86 which is output from the modulator 77 is indicative of a force, which, when applied by the second pair of actuators 5a, 5b, counteract quadrature vibrations at the nodes 21a-21c. The demodulator 72, the regulator 75 and the modulator 77 form a feedback loop which counteracts quadrature vibrations and which may be referred to as a quadrature loop.

The signals 85 and 86 which are output from the modulators 76 and 77 are summed by an adder 78 in order to generate a node excitation signal 35, which is input to the second pair of actuators 5a, 5b. The node excitation signal 35 drives the second pair of actuators 5a, 5b, such that they counteract vibrations at the nodes 21a-21d. The node feedback loop 62 therefore serves to drive the second pair of actuators 5a, 5b in order to null the nodes 21a-21d, such that substantially no displacement of the resonant structure 2 occurs at the nodes 21a-21d.

As explained above, the second control signal $C_2$ is dependent on the rotation rate of the gyroscope 1 and may therefore be used to measure the rotation rate of the gyroscope 1. In general, the relationship between the second control signal $C_2$ and the rotation rate $\Omega$ of the gyroscope 1 may be given by equation 2:

$$C_2 = 2G_2 A(\alpha\Omega - b \sin \beta) \qquad (2)$$

where $G_2$ is a second gain which is also dependent on the electronic gains of the actuators and sensors 3-6 and the control system 100, $\alpha$ is a gyroscope coupling coefficient, b is the amplitude of a harmonic bias error of the gyroscope 1, $\beta$ is the corresponding phase of the harmonic bias error of the gyroscope 1 and A is the amplitude of vibrations which are excited in the resonant structure 2. The gyroscope coupling coefficient $\alpha$ may be identified through a factory calibration and may generally be stable with regard to changes in both time and temperature.

The first and second gains $G_1$ and $G_2$ of equations 1 and 2 may change with changes in time and temperature and may therefore change during operation of the gyroscope 1. In an embodiment in which the gyroscope 1 is symmetrical (e.g. when the resonant structure 2 is a ring, a cylinder, a hemisphere or another symmetrical shape), the first and second gains $G_1$ and $G_2$ may be considered to relate to each other according to equation 3:

$$G_1 = G = G_2(1+\epsilon) \quad (3)$$

where G is a reference gain and $\epsilon$ is a gain error parameter, which is in general small (e.g. $|\epsilon| \ll 1$). The gain error parameter $\epsilon$ may be determined through a factory calibration and may generally be stable with regard to changes in both time and temperature.

Equation 2 which relates the second control signal $C_2$ to the rotation rate $\Omega$ of the gyroscope 1 is often expressed in terms of a scale factor S and a bias B of the gyroscope 1, where the scale factor S and the bias B are given by equations 4 and 5:

$$S = 2GA \quad (4)$$

$$B = b \sin \beta \quad (5)$$

Equation 2 may therefore be rewritten (using equations 3-5 and assuming that $|\epsilon|$ is very small) as equation 6:

$$C_2 = S\alpha\Omega - B \quad (6)$$

The scale factor S may be defined to include the gyroscope coupling coefficient $\alpha$. However, the scale factor S, which is referred to throughout this application, does not include the gyroscope coupling coefficient $\alpha$, and it is the scale factor S (as defined by equation 4) which is found and used in the calibration processes described below. It will be appreciated that a scale factor S that includes the gyroscope coupling coefficient $\alpha$ may easily be derived from the scale factor S as defined by equation 4 by simple multiplication of the scale factor S by the gyroscope coupling coefficient $\alpha$.

It will be appreciated from equation 6 that in order to accurately determine the rotation rate $\Omega$ of the gyroscope 1, the scale factor S and the bias B need to be determined. Typically the scale factor S and/or the bias B may be determined by performing a calibration of the gyroscope 1 when the gyroscope 1 is not in use. For example, the gyroscope 1 may be mounted on a calibration table that rotates at a known rate. The second control signal $C_2$ may be measured while the gyroscope 1 undergoes a known rotation and the quantity $S\alpha$ and/or the bias B may be calculated. Determination of the quantity $S\alpha$ may allow the scale factor S to be determined. However the above described calibration method can only be performed when the gyroscope 1 is placed on a calibration table, for example in a factory or a laboratory. This may require the gyroscope 1 to be removed from a device whose rotation the gyroscope 1 is configured to measure and does not allow for the gyroscope 1 to be calibrated while in the field.

Both the scale factor S and the bias B depend on a variety of factors, such as electronic gains in the control system 100 and the actuators and sensors 3-6, the mechanical properties of the resonant structure 2 and bias and phase errors in the gyroscope 1. Some or all of these factors may change with changes in time and/or temperature, and thus the scale factor S and/or the bias B may change with time and/or temperature. A bias B and/or a scale factor S, which are determined in a laboratory calibration process, may not therefore be accurate for measurements taken at a later time and/or at a different temperature to a temperature at which the calibration was carried out. This may therefore lead to errors in measurements made by the gyroscope 1.

It is therefore desirable to provide a method of calibrating a gyroscope 1 to determine the bias B and/or the scale factor S that may be performed in the field. There are known methods of calibrating a gyroscope 1 in the field in order to determine the scale factor S, however, these methods neglect consideration of the bias B. In general, the bias B may be considered to be an offset in the relationship between vibrations along the node detection axis 16 and the rate of rotation $\Omega$ of the gyroscope 1. Errors in the bias B therefore translate into errors in the determination of the rate of rotation $\Omega$ of the gyroscope 1. It is therefore desirable to provide a method of calibrating a gyroscope 1 to determine the bias B. It is further desirable to provide a method of calibrating a gyroscope 1 to determine the bias B that may be performed at the same time as the gyroscope 1 provides measurements of the rate of rotation $\Omega$ of the gyroscope 1.

In order to calibrate a gyroscope 1, the antinode excitation axis 13 along which vibrations are excited may be rotated with respect to the resonant structure 2. This is in some ways analogous to placing a gyroscope 1 on a calibration table and rotating the gyroscope 1 while keeping the antinode excitation axis 13 fixed with respect to the resonant structure 2. For example, as the antinode excitation axis 13 is rotated around the resonant structure 2, the vibrations in the resonant structure 2 follow the rotation of the axis 13. However the vibrations in the resonant structure 2 have an inertia, which causes the rotation of the vibrations to lag behind the rotation of the antinode excitation axis 13. This is similar to the effect that occurs when the gyroscope 1 is rotated, and the rotation of vibrations in the gyroscope lags behind the rotation of the gyroscope 1.

Advantageously the antinode excitation axis 13 may be rotated around the resonant structure 2 without physically rotating the actuators and sensors 3-6 relative to the resonant structure 2. Instead, the first reference amplitude signal $A_1$ and the second reference amplitude signal $A_2$ may be altered according to an angular position of the antinode excitation axis 13 around the resonant structure 2. For example, the first and second reference amplitude signals may be set according to equations 7 and 8:

$$A_1 = A \cos \theta \quad (7)$$

$$A_2 = A \sin \theta \quad (8)$$

Where $\theta$ is equal to $2\lambda$, and $\lambda$ is the physical angle at which the antinode excitation axis 13 is positioned relative to the position shown in FIGS. 1 and 2. The first and second reference amplitude signals $A_1$, $A_2$ may, for example, be set by a controller (not shown). The angle $\lambda$, at which the antinode excitation axis 13 is positioned, may be rotated by changing the value of $\theta$ in equations 7 and 8.

In an embodiment the control system 100 may be realized using analog electronics. This may allow the antinode excitation axis 13 to be easily rotated using existing hardware and by simply changing the reference amplitude signals $A_1$, $A_2$ which are input to the feedback loops 61, 62. In general, the use of analog electronics may allow the invention to be implemented in a simple fashion with minimal changes to existing hardware.

The angle $\theta$ may be changed at a rate $\dot{\theta}$, where $\dot{\theta}$ is the first time derivative of $\theta$ $$\left(\text{i.e. } \dot{\theta} = \frac{d\theta}{dt}\right).$$

In this case the first $C_1$ and second $C_2$ control signals may be given by equations 9 and 10:

$$C_1 = \frac{G}{(1+\varepsilon)} A(k\cos\theta - 2\sin\theta(\alpha\Omega + \dot{\theta} + b\sin(2\theta - \beta))) \quad (9)$$

$$C_2 = GA(k\sin\theta - 2\cos\theta(\alpha\Omega + \dot{\theta} + b\sin(2\theta - \beta))) \quad (10)$$

In an embodiment of a method of calibrating a gyroscope 1, the antinode excitation is initially positioned at a first angular position. For example the angle $\theta$ may start at $\theta=0$ and the first angular position of the first excitation axis 13 is as shown in FIGS. 1 and 2. The antinode excitation axis 13 is then rotated in a continuous manner to a second angular position. For example, the angle $\theta$ may be rotated from $\theta=0$ to $$\theta = \frac{\pi}{2}$$

at which point the rotation stops. In this example, the physical angle $\lambda$ at which the antinode excitation axis 13 is positioned rotates in a continuous manner through an angle of approximately 45° between the first angular position (when $\theta=0$ and $\lambda=0$) and the second angular position (when $$\theta = \frac{\pi}{2}$$
and
$$\lambda = 45°).$$

During the rotation of $\theta$ and the resulting rotation of the axes 13-16 around the resonant structure 2, the actuators and sensors 3-6 remain stationary with respect to the resonant structure 2. As the angle $\theta$ and the axes 13-16 are rotated, the first and second control signals $C_1$, $C_2$ are indicative of a combination of the vibration of the resonant structure 2 along the antinode axes 13, 14 and along the node axes 15, 16. The proportion of each control signal $C_1$, $C_2$, which is due to vibrations along the antinode axes 13, 14, and the proportion of each control signal $C_1$, $C_2$ which is due to vibrations along the node axes 15, 16, depends on the angle $\theta$. For example, when $\theta=0$ the antinode detection axis 14 extends between the first pair of sensors 4a, 4b whose output signal 34 is used to form the first control signal $C_1$, and thus the first control signal $C_1$ is dependent only on vibrations of the resonant structure 2 along the antinode detection axis 14. When $\theta=0$, the node detection axis 16 extends between the second pair of sensors 6a, 6b, whose output signal 36 is used to form the second control signal $C_2$, and thus and the second control signal $C_2$ is dependent only on vibrations of the resonant structure 2 along the node detection axis 16. When $$\theta = \frac{\pi}{2},$$

the node detection axis 16 extends between the first pair of sensors 4a, 4b, and thus the first control signal $C_1$ is dependent only on vibrations of the resonant structure 2 along the node detection axis 16. When $$\theta = \frac{\pi}{2}$$

the antinode detection axis 14 extends between the second pair of sensors 6a, 6b, and thus the second control signal $C_2$ is dependent only on vibrations of the resonant structure 2 along the antinode detection axis 14.

In the embodiment of the control system 100, which is shown in FIG. 3, the rotation of the antinode detection axis 14 from extending between the first pair of sensors 4a, 4b (when $\theta=0$) to extending between the second pair of sensors 6a, 6b $$\left(\theta = \frac{\pi}{2}\right)$$

may cause the input to the phase locked loop 42 to approach zero as $\theta$ approaches $$\frac{\pi}{2}.$$

This is because as $\theta$ approaches $$\frac{\pi}{2},$$

the input to the phase locked loop 42 becomes strongly dependent on vibrations of the resonant structure 2 along the node detection axis 16, as opposed to vibrations of the resonant structure 2 along the antinode detections axis 14. Under many conditions, the vibrations of the resonant structure 2 along the node detection axis 16 are small, and may be significantly smaller than vibrations of the resonant structure 2 along the antinode detection axis 14. As the angle $\theta$ approaches $$\frac{\pi}{2}$$

(and the node detection axis 16 approaches extending between the first pair of sensors 4a, 4b), the amplitude of the input to the phase locked loop 42 may therefore become small. A small input to the phase locked loop 42 may cause the phase locked loop to become unstable and may affect the stability of the phase reference signals 51, 52.

Figure 4:
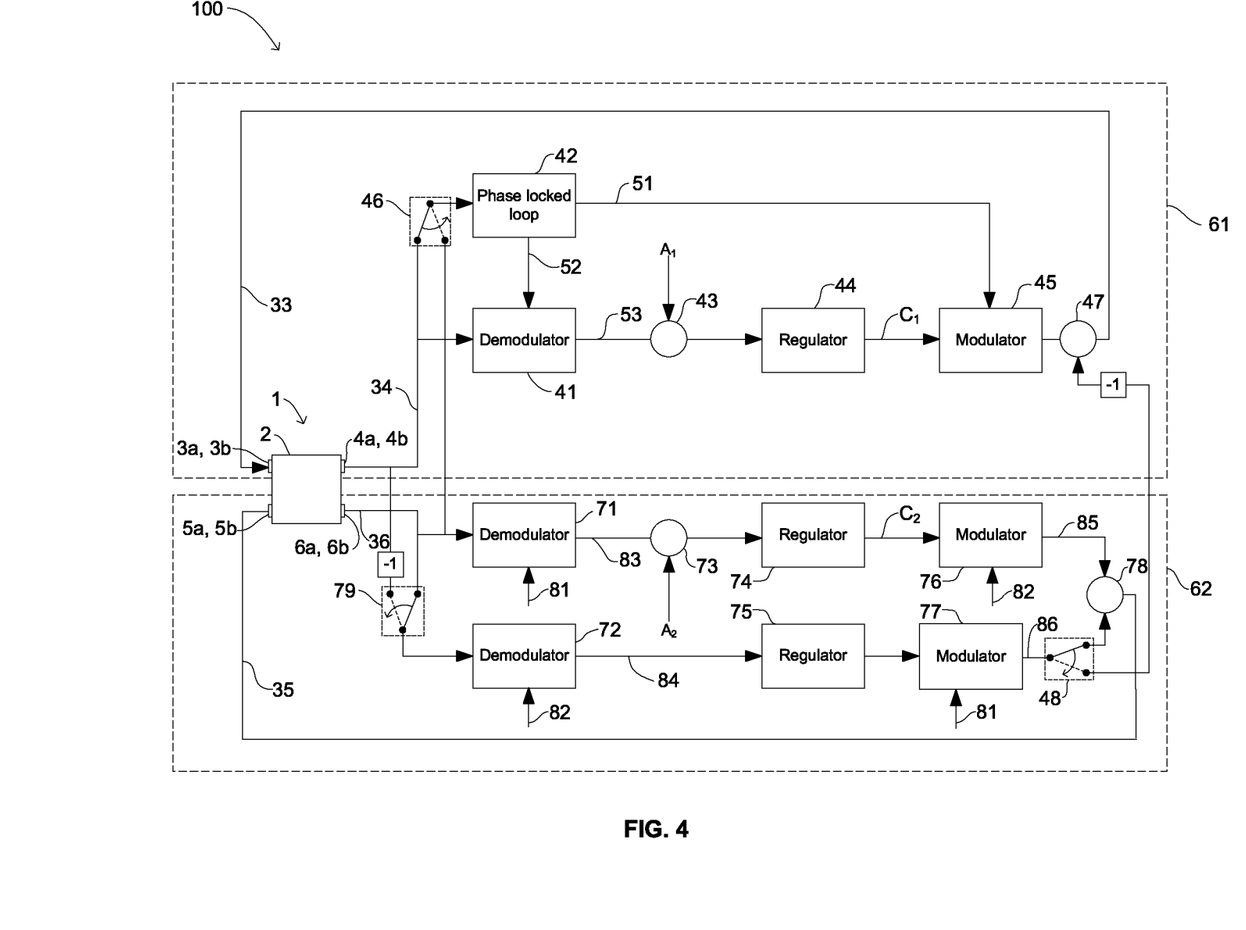
FIG. 4 is a schematic illustration of an alternative embodiment of a control system.

FIG. 4 is a schematic depiction of a control system 100 which may overcome the problem of a small input to the phase locked loop 42 caused by changes in $\theta$. The control system 100 of FIG. 4 includes all of the components of the control system 100 of FIG. 3. These components are labelled with like reference numerals and are not described here again with reference to FIG. 4.

The control system 100 of FIG. 4 additionally includes a switch 46, which is configured to switch the input to the phase locked loop 42 between the detection signal 34, which is output from the first pair of sensors 4a, 4b, and the detection signal 36, which is output from the second pair of sensors 6a, 6b. The switch 46 may connect the detection signal 34 from the first pair of sensors 4a, 4b to the phase locked loop 42 when θ=0 and may connect the detection signal 36 from the second pair of sensors 6a, 6b to the phase locked loop 42 when $$\theta = \frac{\pi}{2}.$$

The input to the phase locked loop 42 may be switched from the detection signal 34 to the detection signal 36 at any angle in between θ=0 and $$\theta = \frac{\pi}{2}.$$

For example, in an embodiment, the switch 46 may switch the input to the phase locked loop 42 from the detection signal 34 to the detection signal 36 when $$\theta = \frac{\pi}{4}.$$

This may ensure that the input to the phase locked loop 42 has a sufficient amplitude for stable operation of the phase locked loop 42 at all times.

It may also be desirable to switch the input to the second demodulator 72 of the feedback loop 62. As the antinode excitation axis 13 rotates around the resonant structure 2, the antinode detection axis 14 rotates away from the first pair of sensors 4a, 4b and towards the second pair of sensors 6a, 6b. Meanwhile the node detection axis 16 rotates away from the second pair of sensors 6a, 6b and towards the first pair of sensors 4a, 4b. The detection signal 34, which is output from the first pair of sensors 4a, 4b, therefore becomes increasingly indicative of vibrations of the resonant structure 2 along the node detection axis 16 and the detection signal 36, which is output from the second pair of sensors 6a, 6b, becomes increasingly indicative of vibrations of the resonant structure 2 along the antinode detection axis 14.

As described above, the input to the phase locked loop 42 may be switched from the detection signal 34 to the detection signal 36. After this switch any quadrature vibrations which are detected by the second pair of sensors 6a, 6b may be nulled by the feedback loop 61, since the detection signal 36 which is output from the second pair of sensors 6a, 6b is now being input to the phase locked loop 42. If the detection signal 36 were to continue to be input to the second demodulator 72, then the output of the second demodulator 72 may approach zero, since the feedback loop 61 is nulling quadrature vibrations, which are detected by the second pair of sensors 6a, 6b. However, the first pair of sensors 4a, 4b may detect quadrature vibrations, which are no longer being nulled, because the detection signal 34 is no longer being input to the phase locked loop 42. The input to the second demodulator 72 of the feedback loop 62 is therefore switched to the detection signal 34 which is output from the first pair of sensors 4a, 4b, such that the feedback loop 62 acts to null quadrature vibrations, which are detected by the first pair of sensors 4a, 4b The input to the demodulator 72 may be switched using a switch 79, as shown in FIG. 4.

The switch 79 is configured to switch the input to the second demodulator 72 between the detection signal 36 from the second pair of sensors 6a, 6b and the detection signal 34 from the first pair of sensors 4a, 4b. The switch 79 may switch the input to the second demodulator 72 from the detection signal 36 to the detection signal 34 at the same time as the switch 46 switches the input to the phase locked loop (e.g., when $$\theta = \frac{\pi}{4}).$$

In order to avoid a sudden jump in the signal which is input to the second demodulator 72, the detection signal 34 is multiplied by −1 before the switch 79 as is shown in FIG. 4. This acts to reduce any jump in input to the second demodulator 72 which occurs when the input to the second demodulator 72 is switched between the detection signals 34, 36 and may avoid a change of sign of input to the second demodulator 72.

When the input to the second demodulator 72 is switched by the switch 79, the excitation signal to which the output 86 of the modulator 77 is added, is also switched. This is because displacements of the resonant structure 2, which are sensed by the first pair of sensors 4a, 4b, are counteracted by the first pair of actuators 3a, 3b, whereas displacements, which are sensed by the second pair of sensors 6a, 6b, are counteracted by the second pair of actuators 5a, 5b. When the switch 79 switches the input to the second demodulator 72 from the detection signal 36 to the detection signal 34, a switch 48 switches the output 86 of the modulator 77, such that the output 86 is added to the excitation signal 33, which drives the first pair of actuators 3a, 3b, since the output 86 is now a function of the detection signal 34 which is output from the first pair of sensors 4a, 4b. The output 86 from the modulator 77 is added to the excitation signal 33 by an adder 47 shown in FIG. 4. Before the output 86 from the modulator 77 is added to the excitation signal 33, it is first multiplied by −1 as is shown in FIG. 4. This reverses the effect of multiplying the detection signal 34 by −1 prior to the switch 79.

In an embodiment the antinode excitation axis 13 is rotated between a first angular position when θ=0 and a second angular position when $$\theta = \frac{\pi}{2}.$$

The switches 46, 48 and 19 may, for example, all be switched at an angle between θ=0 and $$\theta = \frac{\pi}{2}.$$

For example the switches 46, 48 and 79 may all be switched when $$\theta = \frac{\pi}{4}.$$

Switching the switches 46, 48 and 79 at an angle which is close to $$\theta = \frac{\pi}{4}$$

may advantageously reduce the size of any jumps in signals that components of the feedback system 100 receive when the switches 46, 48 and 79 are switched.

In an alternative approach, the role of the antinode and node feedback loops 61, 62 may be completely switched during the rotation of the angle θ. For example at a value of θ between 0 and $$\frac{\pi}{2}$$

(e.g. when $$\theta = \frac{\pi}{4})$$

the input to the antinode feedback loop 61 may be switched from the detection signal 34 to the detection signal 36, and the input to the node feedback loop 62 may switched from the detection signal 36 to the detection signal 34. As the inputs to the feedback loops 61, 62 are switched, the signal which drives the first and second pair of actuators may also be switched. For example, the input to the first pair of actuators 3a, 3b may be switched such that the output from the node feedback loop 62 drives the first pair of actuators 3a, 3b, and the input to the second pair of actuators 5a, 5b may be switched such that the output from the antinode feedback loop 61 drives the second pair of actuators 5a, 5b. After such a switch, the antinode feedback loop 61 drives the second pair of actuators 5a, 5b based on the detection signal 36 from the second pair of sensors 6a, 6b, and the node feedback loop 62 drives the first pair of actuators 3a, 3b based on the detection signal 34 from the first pair of sensors 4a, 4b.

It will be appreciated that a switch of the roles of the antinode and node feedback loops 61, 62 will also change the information that is carried by the first and second control signals $C_1$, $C_2$. For example, after a switch of roles of the feedback loops 61, 62, the control signal which is output from the node feedback loop 62 becomes the first control signal $C_1$, and the control signal which is output from the antinode feedback loop 61 becomes the second control signal $C_2$. In equations presented throughout this description, the first control signal is taken to be the control signal which is set according to the detection signal 34, which is output from the first pair of sensors 4a, 4b, and the second control signal is taken to be the control signal set according to the detection signal 36, which is output from the second pair of sensors 6a, 6b.

The bias B may be calculated by considering the second control signal $C_2$ when the antinode excitation axis 13 is at a first angular position (e.g. when θ=0), and the first control signal $C_1$, when the antinode excitation axis 13 is at a second angular position (e.g. when θ=π/2). When the antinode excitation axis 13 is in a first angular position (extending between the first pair of actuators 3a, 3b) and θ=0, the angle θ may be stationary such that θ'=0. Inserting these values into equation 10 gives rise to equation 11:

$$C_2(0) = 2GA(1+\epsilon)(\alpha\Omega - b \sin \beta) \quad (11)$$

The second control signal $C_2(0)$, when the antinode excitation axis 13 is in the first angular position, as given by equation 11, may be considered to be a first sensing signal of the calibration process. The first sensing signal $C_2(0)$ is indicative of vibrations of the resonant structure 2 on a first sensing axis of the resonant structure 2, while the antinode excitation axis 13 is in the first angular position. In this example, the first sensing axis is the node detection axis 16 that extends between the second pair of sensors 6a, 6b when θ=0.

After a rotation has taken place, the antinode excitation axis 13 is in a second angular position (extending between the second pair of actuators 5a, 5b) and $$\theta = \frac{\pi}{2}.$$

The angle θ may once again be stationary such that θ'=0. Inserting these values into equation 9 gives rise to equation 12:

$$C_1\left(\frac{\pi}{2}\right) = -2GA(\alpha\Omega + b\sin\beta) \quad (12)$$

The first control signal $$C_1\left(\frac{\pi}{2}\right)$$

when the antinode excitation axis 13 is in the second angular position, as given by equation 12, may be considered to be a second sensing signal of the calibration process. The second sensing signal $$C_1\left(\frac{\pi}{2}\right)$$

is indicative of vibrations of the resonant structure 2 on a second sensing axis of the resonant structure 2, while the antinode excitation axis 13 is in the second angular position. In this example, the second sensing axis is the node detection axis 16, which extends between the first pair of sensors 4a, 4b when $$\theta = \frac{\pi}{2}.$$

The bias B of the gyroscope 1 may be determined by adding the first sensing signal to the second sensing signal. The first sensing signal and the second sensing signal may, for example, be added together by a controller (not shown), which may use the sum of the first and second sensing signals to determine the bias B. Adding equations 11 and 12 together gives rise to equation 13:

$$C_2(0) + C_1\left(\frac{\pi}{2}\right) = 2GA((1+\varepsilon)(\alpha\Omega - b\sin\beta) - (\alpha\Omega + b\sin\beta)) \quad (13)$$

In some cases the gain error may be considered to be negligible, and thus the gain error parameter $\epsilon$ may be considered to be equal to zero. In this case equation 13 reduces to give equation 14:

$$C_2(0) + C_1\left(\frac{\pi}{2}\right) = -4GAb\sin\beta = -4GAB = -2SB \quad (14)$$

It can be seen from equation 14 that if the scale factor S is known, then, by adding the second control signal $C_2$ when the antinode excitation axis 13 is in the first angular position, to the first control signal $C_1$ when the antinode excitation axis 13 is in the second angular position, and neglecting the gain error parameter $\epsilon$, the bias B can be derived. However in order to increase the accuracy with which the bias B is derived the gain error parameter $\epsilon$ may be included in the determination of the bias B. In this case equation 13 may be rearranged to give equation 15:

$$b\sin\beta = B - \frac{C_2(0) + C_1\left(\frac{\pi}{2}\right)}{2S\left(1 + \frac{\epsilon}{2}\right)} + \frac{\epsilon}{2}\alpha\Omega \quad (15)$$

It will be appreciated from equation 15 that deriving the bias B using equation 15 requires knowledge of the scale factor S and the rotation rate $\Omega$ of the gyroscope 1. The rotation rate $\Omega$ of the gyroscope 1 may be determined by rearranging equation 13 to give an equation for $b \sin \beta$ and substituting this into equation 12. Rearranging the resulting equation and assuming that $|\epsilon| \ll 1$ gives an approximation of the rotation rate $\Omega$ of the gyroscope 1, which is given by equation 16:

$$\Omega \approx \frac{1}{2S\alpha\left(1 + \frac{\epsilon}{2}\right)}\left(\left(1 - \frac{\epsilon}{2}\right)C_2(0) - \left(1 + \frac{\epsilon}{2}\right)C_1\left(\frac{\pi}{2}\right)\right) \quad (16)$$

With knowledge of the scale factor S, equation 16 may therefore be used to calculate the rotation rate $\Omega$ of the gyroscope 1 which may then be substituted into equation 15 to derive the bias B. This method advantageously allows the bias B to be calculated with increased accuracy by including consideration of the gain error parameter $\epsilon$. The gain error parameter $\epsilon$ may, for example, be determined in a factory calibration process and may be considered to be relatively stable with regard to changes in time and/or temperature.

Rotating the angle $\theta$ between a first and second angular position in a continuous manner advantageously allows the rotation rate $\Omega$ of the gyroscope 1 to be continuously measured while a calibration process to determine the bias B is being carried out. While the angle $\theta$ is being rotated the rotation rate measurement, which is output by the gyroscope 1, represents a combination of the actual rotation rate $\Omega$ of the gyroscope 1 and the rate of rotation $\theta'$ of the angle $\theta$. The rate of rotation $\theta'$ of the angle $\theta$ is known and may therefore be subtracted from the rotation rate measurement which is output by the gyroscope 1 in order to derive the true rotation rate $\Omega$ of the gyroscope 1. Equation 16 may equivalently be used to measure the rotation rate $\Omega$ of the gyroscope 1 while a calibration process to determine the bias B is being carried out (assuming that the rotation rate $\Omega$ is constant between the first and second angular positions).

Rotating the angle $\theta$ between a first and second angular position in a continuous manner, so as to allow continuous monitoring of the rotation rate $\Omega$ when the gyroscope 1 is being calibrated, is advantageous for applications where it is desirable that there is no significant interruption in the measurement of the rotation rate $\Omega$. In some applications multiple gyroscopes may be positioned to measure the same rotation. This may provide redundancy and may allow one gyroscope to measure rotation while another gyroscope is calibrated. However, the method described above allows the rotation rate of a gyroscope 1 to be measured at the same time as a calibration is performed, and thus a need for multiple gyroscopes configured to measure the same rotation is reduced.

While a specific embodiment of a method of calculating the bias B has been described above, in which the angle $\theta$ is rotated in a continuous manner from 0 to $$\frac{\pi}{2},$$

it will be appreciated that other rotations of the angle $\theta$ may instead be used. For example, the bias B may be determined in a calibration process in which the angle $\theta$ is initially equal to $$\frac{\pi}{2}$$

and is rotated from $$\frac{\pi}{2}$$

to 0. The first and second control signals $C_1$ and $C_2$ at the two extremes of this rotation (when $\theta=0$ and when $$\theta = \frac{\pi}{2})$$

may be used in equations 13-16 in order to determine the bias B. In an embodiment of a calibration method, the angle $\theta$ may be successively rotated between two angles. For example, the angle $\theta$ may be rotated from $\theta=0$ to $$\theta = \frac{\pi}{2}$$

and then may be rotated from $$\theta = \frac{\pi}{2}$$

back to $\theta=0$.

The angle $\theta$ may be rotated between two angular positions (e.g. between $\theta=0$ and $$\theta = \frac{\pi}{2})$$

at any rotational rate $\theta'$. For example the angle $\theta$ may be rotated between two angular positions at a constant speed. In some embodiments the rate of rotation θ' of the angle θ may vary as θ is rotated between the two angular positions (e.g. between θ=0 and $$\theta = \frac{\pi}{2}).$$

For example, in an embodiment the angle θ may be stationary (i.e., θ'=0) at a first angular position (e.g. θ=0) such that the second control signal $C_2$ may be measured at the first angular position. The rate of rotation θ' may then be increased such that θ rotates in a continuous manner towards a second angular position $$(e.g. \;\; \theta = \frac{\pi}{2}).$$

The rate of rotation $\dot{\theta}$ may, for example, continuously increase until θ is mid-way between the first and second angular positions. The rate of rotation θ' may then decrease as θ approaches the second angular position, at which point θ may be stationary, and the first control signal $C_1$ may be measured at the second angular position. The first control signal $C_1$ at the second angular position may then be added to the second control signal $C_2$ at the first angular position in order to derive the bias B as was described above with reference to equation 15.

Increasing and decreasing the rate of rotation θ' of the angle θ between the first and second angular positions may advantageously reduce the amount of time between making measurements of the first and second control signals at the first and second angular positions in order to derive the bias B, while allowing the angle θ to be stationary at the first and second angular positions. The angle θ being stationary at the first and second angular positions may increase the accuracy of measurements of the first and second control signals, which are made at the first and second angular positions. However, in some embodiments, the angle θ may not be stationary at the first and/or the second angular positions. Instead, the angle θ may be rotated through the first and/or the second angular positions and the first and second control signals may be measured as the angle θ passes through the first and second angular positions in order to derive the bias B. However, measuring the first and/or the second control signals as the angle θ is rotated through the first and/or the second angular positions may disadvantageously reduce the accuracy of the determination of the bias B. In an embodiment in which the angle θ is not stationary at the first and/or the second angular positions, the rate of rotation $\dot{\theta}$ of the angle θ may be reduced in the vicinity of the first and/or the second angular positions in order to increase the accuracy of the determination of the bias B.

The methods that have been described above (with reference to equations 11-16) to derive the bias B rely on an assumption that the rotation rate Ω of the gyroscope 1 is the same when the antinode excitation axis 13 is in the first angular position (e.g., when θ=0) as when the antinode excitation axis 13 is in the second angular position (e.g., when $$\theta = \frac{\pi}{2}).$$

This may, for example, be true if the calibration is carried out at a time when the gyroscope 1 is known to be stationary. However this may not always be practical, and it may be desirable to perform the calibration at times when the gyroscope 1 is not stationary. If the gyroscope is located on a platform, such as a ship, which experiences low angular rotation rates and low angular acceleration changes, then rotation of the platform will have an insignificant effect upon the calibration (for example if the calibration is performed over a time period of 50 ms). If the gyroscope is located on a platform such as an aircraft or a missile, then the angular rotation rates and angular acceleration changes may significantly, affect the calibration (for example if the calibration is performed over a time period of 50 ms). Where this is the case, then the time period of the calibration may be reduced significantly, such that the change of rotation rate is less than the desired calibration accuracy. Any change in rotation rate during the calibration will appear directly as a bias error. In general, the calibration described above may be carried out in a time period which is sufficiently short, that any change of rotation rate Ω of the gyroscope is less than a desired accuracy of the calibration.

As explained above, in order to calculate the bias B some knowledge of the scale factor S may be required. In practice the knowledge of the value Sα may be required during operational use of the gyroscope 1. However the gyroscope coupling coefficient α may be stable with regard to changes in time and temperature and may be identified through a factory calibration. Determining the scale factor S therefore allows the value Sα to be determined. The scale factor S may be determined in a factory calibration process. However the scale factor S may vary with time and/or temperature. This may lead to some uncertainty in the scale factor S, if a factory calibration value of the scale factor is relied upon when the gyroscope 1 is used in the field at a later time and/or at a different temperature. The uncertainty in the scale factor S may contribute to an uncertainty in the bias B, when the bias is determined using the above described method. The uncertainty in the scale factor S may, for example, be one of the largest contributions to the uncertainty in the bias B. It may therefore be desirable to provide a method of determining the scale factor S in a calibration process which may be carried out in the field at a time and/or temperature which is similar to the time and/or temperature at which the bias B is determined. A scale factor S determined in this way may be used to improve the accuracy of the determination of the bias B.

The scale factor S may, for example, be determined by using one or more of the methods disclosed by published PCT patent application WO2013055253 which is hereby incorporated by reference in its entirety. WO2013055253 discloses two main methods of determining the scale factor S. The first method disclosed by WO2013055253 comprises applying a quadrature vibration along the node excitation axis 15. The quadrature vibration may be applied by adding a modulation to the signal 35 which drives the second pair of actuators 5a, 5b. The quadrature vibration may have a frequency that is outside of the bandwidth of the feedback loop 62, and thus the quadrature vibration may not be nulled by the feedback loop 62. The quadrature vibration may be detected in the detection signal 36, which is output by the second pair of sensors 6a, 6b. The detection signal 36 may provide an output proportional to the scale factor S. The detection signal 36 may be measured, and changes in the detection signal 36 may be used to determine changes in the scale factor S.

The second method disclosed by WO2013055253 comprises applying a quadrature vibration along the antinode excitation axis 13. The quadrature vibration may be applied by adding a modulation to the signal 33, which drives the first pair of actuators 3a, 3b. The quadrature vibration may have a frequency which is outside of the bandwidth of the feedback loop 61, and thus the quadrature vibration may not be nulled by the feedback loop 61. The quadrature vibration may be detected in the detection signal 34 output by the first pair of detectors 4a, 4b. The detection signal 34 may provide an output proportional to the scale factor S. The detection signal 34 may be measured and changes in the detection signal 34 may be used to determine changes in the scale factor S.

WO2013055253 also discloses additional methods and variations on the first and second methods which were described above. One or more of the methods disclosed by WO2013055253 may be used in order to determine the scale factor S and the value of the scale factor S may be used in order to derive the bias B.

The scale factor S may, alternatively, be determined by rotating the angle $\theta$ in a first direction and at a first rotation rate $\theta'$ to a given value of $\theta$ $$\left(\text{e.g.,}\quad \theta=0 \text{ or } \theta=\frac{\pi}{2}\right).$$

The direction of rotation of the angle $\theta$ may then be reversed and the angle $\theta$ may be rotated at a second rotation rate $\theta'$, which has substantially the same magnitude as the first rotation rate.

During a rotation of $\theta$ the first and second control signals $C_1$, $C_2$ may be related to the $\theta$ rotation rate $\theta'$ and the rotation rate $\Omega$ of the gyroscope 1 according to equation 17:

$$\alpha\Omega + \dot{\theta} \approx \frac{C_2\cos\theta - C_1\sin\theta}{S(1+\varepsilon\cos\theta)} - \frac{k\varepsilon}{4}\sin 2\theta - b\sin(2\theta - \beta) \quad (17)$$

The scale factor S may, for example, be determined by rotating the angle $\theta$ at a calibration rotation rate $\theta'=-\theta_c$ towards the angle $\theta=0$ and then reversing the rotation of the angle $\theta$ such that the angle $\theta$ rotates at the calibration rotation rate $\theta'=\theta_c$ away from the angle $\theta=0$. Equation 17 may be evaluated at a time shortly before the angle $\theta$ reaches zero. At such a time $\theta=\Delta_1$, where $\Delta_1$ is a small angle close to zero and $\theta'=-\theta_c$. Inserting these values into equation 17 and assuming that $\Delta_1$ is close to zero gives rise to equation 18:

$$\alpha\Omega(\Delta_1) - \dot{\theta}_c \approx \frac{C_2(\Delta_1)}{S(\Delta_1)(1+\varepsilon)} + B(\Delta_1) \quad (18)$$

Equation 17 may also be evaluated at a time shortly after the angle $\theta$ leaves zero. At such a time $\theta=\Delta_2$ where $\Delta_2$ is a small angle close to zero and $\theta'=\theta_c$. Inserting these values into equation 17 and assuming that $\Delta_2$ is close to zero gives rise to equation 19:

$$\alpha\Omega(\Delta_2) + \dot{\theta}_c \approx \frac{C_2(\Delta_2)}{S(\Delta_2)(1+\varepsilon)} + B(\Delta_2) \quad (19)$$

The angles $\Delta_1$ and $\Delta_2$ may, for example, be approximately 1° and the calibration rotation rate $\theta_c$ may be approximately 100° per second. In this case the time difference between when $\theta=\Delta_1$ and when $\theta=\Delta_2$ may be approximately 20 milliseconds. Over such a time period the rotation rate $\Omega$ of the gyroscope 1, the scale factor S and the bias B may all be considered to be constant such that $\Omega(\Delta_1)=\Omega(\Delta_2)$, $S(\Delta_1)=S(\Delta_2)$ and $B(\Delta_1)=B(\Delta_2)$. By using these assumptions and subtracting equation 18 from equation 19 an equation for the scale factor S may be derived. This equation is shown below as equation 20:

$$S = \frac{(C_2(\Delta_2) - C_2(\Delta_1))}{2\dot{\theta}_c(1+\varepsilon)} \quad (20)$$

Equation 20 may therefore be used to derive the scale factor S, which may be inserted into equations 15 and 16 in order to derive the bias B. The accuracy with which the scale factor S may be derived using equation 20 may depend on the stability of the rotation rate $\Omega$ of the gyroscope 1 during the calibration process. For example, if the value of the rotation rate $\Omega$ of the gyroscope 1 changes by approximately 0.025° per second between the time when $\theta=\Delta_1$ and when $\theta=\Delta_2$, then the scale factor S may be determined with an accuracy of approximately 0.01%. If the rotation rate $\Omega$ of the gyroscope 1 changes by more than 0.025° per second during the calibration process then the accuracy with which the scale factor is determined may decrease. If the rotation rate $\Omega$ of the gyroscope 1 changes by less than 0.025° per second during the calibration process, then the accuracy with which the scale factor is determined may increase.

In an embodiment the time period between when $\theta=\Delta_1$ and when $\theta=\Delta_2$ may be less than approximately 50 milliseconds (e.g., approximately 20 milliseconds). Over such a time period the rotation rate $\Omega$ of the gyroscope 1 may reasonably be expected to change by approximately 0.025° per second or less, and thus the scale factor S may be derived to an accuracy of approximately 0.01% or less. In some embodiments, the rotation rate $\Omega$, which is output by the gyroscope, may be monitored in order to determine when a change in the rotation rate of less than 0.025° per second occurs, and thus when the scale factor S may be derived to an accuracy of approximately 0.01% or less. Random variations in the output of the gyroscope may be monitored, and when the random variations are significantly less than 0.025° per second, then the scale factor S may be determined.

The method for deriving the scale factor S which was described above (with reference to equations 18-20) comprises rotating the angle $\theta$ towards and away from $\theta=0$. However it will be appreciated that the angle $\theta$ may be rotated towards and away from values of $\theta$ other than $\theta=0$. For example, the angle $\theta$ may be rotated towards and away from the angle $$\theta = \frac{\pi}{2}.$$

By considering angles that are reached before and after $$\theta = \frac{\pi}{2}$$

and which are close to $$\theta = \frac{\pi}{2},$$

equations which are equivalent to equations 18 and 19 may be derived. By taking the difference between these two equations, an equation which is equivalent to equation 20 may be found. It will be appreciated that such an equation will depend on the first control signal $C_1$ as opposed to the second control signal $C_2$ on which equation 20 depends. Values of the first control signal $C_1$ may therefore be taken in order to derive the scale factor S about an angle of $$\theta = \frac{\pi}{2}.$$

In some embodiments the angle $\theta$ may be rotated towards and away from values of $\theta$ other than $\theta=0$ and $$\theta = \frac{\pi}{2}.$$

However values or $\theta=0$ and $$\theta = \frac{\pi}{2}$$

advantageously simplifies equation 17 since instances of sin $\theta$ and cos $\theta$ reduce to 0 or 1. Using values of $\theta$ other than $\theta=0$ and $$\theta = \frac{\pi}{2}$$

may therefore add complexity to the derivation of the scale factor S.

While specific embodiments of control systems 100 and arrangements of actuators and sensors 3-6 have been described above and depicted in the figures it should be appreciated that other control systems may be used to perform a calibration of a gyroscope. For example, in some embodiments elements (e.g., piezoelectric and/or electrostatic elements) may be used which may function as either a sensor or an actuator. In such embodiments, the role of the elements may be changed such that an actuator may function as a sensor or vice versa. This may, for example, allow the elements which excite vibrations, and the elements which sense vibrations in the resonant structure 2, to be changed. This may allow multiple calibrations to be performed with different elements performing different roles. The results of the multiple calibrations may be averaged which may lead to an averaging out of errors and may increase the accuracy of the calibration.

While specific embodiments of the invention have been described above, it will be appreciated that the invention may be practiced otherwise than as described. The descriptions above are intended to be illustrative, not limiting. Thus it will be apparent to one skilled in the art that modifications may be made to the invention as described without departing from the scope of the appended claims.

The invention claimed is:

1. A method of calibrating a vibrating gyroscope comprising:
   exciting a vibration along an excitation axis of a resonant structure wherein the excitation axis is positioned at a first angular position;
   sensing the vibration of the resonant structure on a first sensing axis of the resonant structure while the excitation axis is positioned at the first angular position;
   generating a first sensing signal indicative of the sensed vibration of the resonant structure on the first sensing axis;
   rotating the excitation axis in a continuous manner around the resonant structure to a second angular position;
   sensing the vibration of the resonant structure on a second sensing axis of the resonant structure while the excitation axis is positioned at the second angular position;
   generating a second sensing signal indicative of the sensed vibration of the resonant structure on the second sensing axis; and
   adding the first sensing signal to the second sensing signal to derive a bias of the gyroscope.

2. The method of claim 1, wherein the first angular position of the excitation axis is separated from the second angular position of the excitation axis by approximately 45°.

3. The method of claim 1, wherein the first sensing axis is aligned at an angle of approximately 45° relative to the first angular position of the excitation axis.

4. The method of claim 1, wherein the second sensing axis is aligned at an angle of approximately 45° relative to the second angular position of the excitation axis.

5. The method of claim 1, further comprising determining a rotation rate of the gyroscope while the excitation axis is rotated.

6. The method of claim 5, wherein the rotation rate of the gyroscope is determined from the first sensing signal and the second sensing signal.

7. The method of claim 6, wherein the determined rotation rate of the gyroscope is used to determine the bias of the gyroscope.

8. The method of claim 1, further comprising determining a scale factor of the gyroscope.

9. The method of claim 8, wherein the determined scale factor is used to determine the bias of the gyroscope.

10. The method of claim 8, wherein determining the scale factor comprises the steps of:
    rotating the excitation axis in a first direction and at a first speed towards an angular position;
    sensing the vibration of the resonant structure on a sensing axis at a first time shortly before the excitation axis reaches the angular position and generating a first scale factor sensing signal indicative of the sensed vibration;
    rotating the excitation axis away from the angular position at the first speed and in a second direction which is opposite to the first direction;
    sensing the vibration of the resonant structure on the sensing axis at a second time shortly after the excitation axis leaves the angular position and generating a second scale factor sensing signal indicative of the sensed vibration; and
    calculating the difference between the first and second scale factor sensing signals in order to derive a scale factor of the gyroscope.

11. The method of claim 10, wherein the sensing axis is separated from the angular position by approximately 45°.

12. The method of claim 10, wherein the difference between the first time and the second time is less than approximately 50 milliseconds.

13. A gyroscope comprising:
    a resonant structure;
    a first and second pair of actuators configured to excite a vibration along an excitation axis of the resonant structure, the first and second pair of actuators being operable to rotate the excitation axis in a continuous manner between a first angular position and a second angular position;

a first pair of sensors configured to sense the vibration of the resonant structure along a first sensing axis while the excitation axis is at the first angular position and generate a first sensing signal indicative of the sensed vibration;

a second pair of sensors configured to sense the vibration of the resonant structure along a second sensing axis while the excitation axis is at the second angular position and generate a second sensing signal indicative of the sensed vibration; and a controller configured to add the first sensing signal to the second sensing signal in order to derive a bias of the vibrating gyroscope.

14. The gyroscope of claim 13, wherein the first angular position of the excitation axis is separated from the second angular position of the excitation axis by approximately 45°.

15. The gyroscope of claim 13, wherein the first sensing axis is aligned at an angle of approximately 45° relative to the first angular position of the excitation axis.

16. The gyroscope of claim 13, wherein the second sensing axis is aligned at an angle of approximately 45° relative to the second angular position of the excitation axis.

17. The gyroscope of claim 13, wherein the controller is further configured to determine a rotation rate of the gyroscope while the excitation axis is being rotated.

18. The gyroscope of claim 17, wherein the controller is configured to determine the rotation rate of the gyroscope from the first and second sensing signals.

19. The gyroscope of claim 18, wherein the controller is configured to use the determined rotation rate of the gyroscope to determine the bias of the gyroscope.

20. The gyroscope of claim 13, further comprising a first feedback loop configured to compare the amplitude of vibrations sensed by the first pair of sensors to a first reference amplitude signal and regulate the first pair of actuators according to the comparison.

21. The gyroscope of claim 13, further comprising a second feedback loop configured to compare the amplitude of vibrations sensed by the second pair of sensors to a second reference amplitude signal and regulate the second pair of actuators according to the comparison.

22. The gyroscope of claim 21, wherein rotating the excitation axis between the first angular position and the second angular position comprises altering the first and second reference amplitude signals.

23. The gyroscope of claim 13, wherein the controller is further configured to determine a scale factor of the gyroscope.

24. The gyroscope of claim 22, wherein:

the first and second pair of actuators are configured to rotate the excitation axis in a first direction and at a first speed towards an angular position and to rotate the excitation axis away from the angular position at the first speed and in a second direction which is opposite to the first direction;

the first pair of sensors are configured to sense the vibration of the resonant structure on a sensing axis at a first time shortly before the excitation axis reaches the angular position and generate a first scale factor sensing signal which is indicative of the sensed vibration;

the first pair of sensors are further configured to sense the vibration of the resonant structure on the sensing axis at a second time shortly after the excitation axis leaves the angular position and generate a second scale factor sensing signal which is indicative of the sensed vibration; and the controller is configured to calculate the difference between the first and second scale factor sensing signals in order to derive a scale factor of the gyroscope.

25. A gyroscope comprising:

a resonant structure;

a first and second pair of actuators configured to excite a vibration along an excitation axis;

a first pair of sensors configured to sense the vibration of the resonant structure along a first sensing axis and generate a first sensing signal indicative of the sensed vibration;

a first feedback loop comprising analogue electronics configured to compare the first sensing signal to a first reference amplitude signal and drive the first pair of actuators according to the comparison;

a second pair of sensors configured to sense the vibration of the resonant structure along a second sensing axis and generate a second sensing signal indicative of the sensed vibration;

a second feedback loop comprising analogue electronics configured to compare the second sensing signal to a second reference amplitude signal and drive the second pair of actuators according to the comparison; and a controller configured to provide the first reference amplitude signal to the first feedback loop and to provide the second reference amplitude signal to the second feedback loop, wherein the controller is operable to vary the first and second reference amplitude signals in order to bring about a rotation of the excitation axis around the resonant structure.

26. The gyroscope of claim 25, wherein comparing the first sensing signal to the first reference amplitude signal comprises demodulating the first sensing signal with respect to a first oscillating phase reference signal and determining the difference between the demodulated signal and the first reference amplitude signal.

27. The gyroscope of claim 25, wherein comparing the second sensing signal to the second reference amplitude signal comprises demodulating the second sensing signal with respect to a second oscillating phase reference signal and determining the difference between the demodulated signal and the second reference amplitude signal.

28. The gyroscope of claim 27, wherein the first oscillating phase reference signal and the second phase reference signal have the same frequency and phase.

29. The gyroscope of claim 25, wherein the controller is operable to vary the first and second reference amplitude signals such that they are sinusoidal signals with respect to time.

30. The gyroscope of claim 29, wherein the controller is operable to vary the first and second reference amplitude signals such that the sinusoidal signals have a substantially constant phase difference of $$\frac{\pi}{2}.$$

31. The gyroscope of claim 29, wherein the controller is operable to vary the first and second reference amplitude signals such that the sinusoidal signals have substantially the same amplitude.

32. The gyroscope of claim 25, wherein the controller is further configured to add the first sensing signal to the second sensing signal in order to derive a bias of the vibrating gyroscope.

33. The gyroscope of claim 25, wherein:
the controller is further configured to vary the first and second reference amplitude signals in order to bring about a rotation of the excitation axis in a first direction and at a first speed towards an angular position and vary the first and second reference amplitude signals in order to bring about a rotation of the excitation axis away from the angular position at the first speed and in a second direction which is opposite to the first direction;

the first pair of sensors are configured to sense the vibration of the resonant structure on a sensing axis at a first time shortly before the excitation axis reaches the angular position and generate a first scale factor sensing signal indicative of the sensed vibration;

the first pair of sensors are further configured to sense the vibration of the resonant structure on the sensing axis at a second time shortly after the excitation axis leaves the angular position and generate a second scale factor sensing signal which is indicative of the sensed vibration; and the controller is further configured to calculate the difference between the first and second scale factor sensing signals in order to derive a scale factor of the gyroscope.

* * * * *